United States Patent

[11] 3,630,826

[72] Inventors Henry J. Rose;
Albin F. Turbak, both of Danville, Ill.
[21] Appl. No. 731,519
[22] Filed May 23, 1968
[45] Patented Dec. 28, 1971
[73] Assignee Tee-Pak, Inc.
Chicago, Ill.

[54] WATER AND OXYGEN IMPERMEABLE FILM LAMINATE BONDED BY SARAN AND POLYISOCYANATE WITH A CURING AGENT
2 Claims, 5 Drawing Figs.

[52] U.S. Cl. ................................................. 161/190,
161/184, 161/227, 161/231, 161/251, 161/254,
161/256, 260/830 P, 260/859 R
[51] Int. Cl. ....................................... B32b 27/30,
B32b 27/38, B32b 27/40
[50] Field of Search .............................................. 161/190,
254, 256, 231, 251, 184; 260/859, 830 P

[56] References Cited
UNITED STATES PATENTS

| | | | | |
|---|---|---|---|---|
| 2,884,340 | 4/1959 | Loshack | | 260/859 |
| 3,024,216 | 3/1962 | Smitmans et al. | | 260/859 |
| 3,210,439 | 10/1965 | Aitken et al. | | 260/859 |
| 3,257,261 | 6/1966 | Hochberg | | 161/256 X |
| 2,460,573 | 2/1949 | Folt | | 260/78.5 |
| 2,504,417 | 4/1950 | Hofrichter | | 161/DIG. 2 |
| 2,948,691 | 8/1960 | Windemuth | | 260/2.5 |
| 3,280,217 | 10/1966 | Lader | | 260/844 |
| 3,297,518 | 1/1967 | Maschner et al. | | 161/184 |

FOREIGN PATENTS

| 1,091,200 | 11/1967 | Great Britain | 260/859 |
|---|---|---|---|

*Primary Examiner*—John T. Goolkasian
*Assistant Examiner*—C. B. Cosby
*Attorney*—Neal J. Mosely ABSTRACT: Impermeable plastic film laminates for use in the packaging of food products and other materials are formed by lamination of polyethylene or other plastic films to plastic films such as nylon, polyester, cellophane, polypropylene, polyethylene, polyvinyl chloride, etc., by using an improved oxygen impermeable saran-containing adhesive composition as the laminating adhesive. The improved saran-containing adhesive composition of this invention includes a polymeric polyisocyanate adhesive and a suitable cross-linking agent therefor, in addition to the vinylidene chloride-acrylonitrile or other saran resin (copolymer or polymer). The adhesive composition is self-curing and the resulting film laminate is flexible and highly impermeable to oxygen while the adhesive layer is highly resistant to the action of boiling water. The cross-linking agent can be a glycol, triol, polyglycol, polytriol or any long-chain polyol, or a derivative thereof, such as a partial ester of a polyol. The preferred cross-linking agent is a polyoxypropylene triol with a molecular weight about 1,000.

ALBIN F TURBAK
HENRY J ROSE
*INVENTOR.* their attorney

ALBIN F TURBAK
HENRY J ROSE
INVENTOR.

BY their attorney

ALBIN F TURBAK
HENRY J ROSE
*INVENTOR.*

BY their attorney

WATER AND OXYGEN IMPERMEABLE FILM LAMINATE BONDED BY SARAN AND POLYISOCYANATE WITH A CURING AGENT

BACKGROUND OF THE INVENTION

This invention relates to new and useful improvements in the production of a new and improved impermeable adhesive and laminated film packaging materials and methods of manufacturing the same, and especially to the production of oxygen and moisture vapor impermeable film packaging materials by adhesive lamination of polyethylene or other plastic films to films such as nylon, polyester, cellophane, polypropylene, polyethylene, polyvinyl chloride, etc., with an improved saran-containing adhesive.

A thin packaging material that has low oxygen gas and moisture vapor transmission rates is needed for many of today's packaging requirements, especially for protection against flavor loss or contamination and against moisture loss or gain. Saran films are known for these protective qualities.

The term saran applies to a family of thermoplastic resins, viz vinylidene chloride polymers, and copolymers of vinylidene chloride with other monomers such as vinyl chloride, acrylonitrile, methyl methacrylate, acrylates, acrylate esters, vinyl acetate, and nitrocellulose. Copolymers of vinylidene chloride with other monomers are generally described in terms of the weight ratio of the monomer units in the copolymer. Saran, by definition, has at least 50 percent vinylidene chloride.

Saran, as a packaging material, has several defects. Saran film is expensive and is difficult to seal into packages. Because of these factors, saran has been used extensively as a coating or laminate on other packaging films.

Cellophane has been coated with saran by several processes to produce a film having good barrier properties. However, the coating operation is relatively expensive and, if the coating is made too thick, the flexible film performance will be lost. Furthermore, saran-coated cellophane is not heat sealable which has limited its field of use considerably.

Plastic film laminates having oxygen and moisture vapor barrier properties have been provided through the use of multiply film laminates wherein at least one of the plies is oxygen and moisture vapor impermeable. This ply is normally saran, saran-coated polyethylene, or saran-coated cellophane film ply. Typically, the saran or saran-coated cellophane film is adhesively laminated onto a film (or films) such as polyethylene as a heat-sealable medium. However, this process uses expensive equipment not available to most film converters. It would be desirable to produce an impermeable laminate by a simpler and/or less expensive process.

STATEMENT OF OBJECTS AND FEATURES

It is, therefore, one object of this invention to provide a new and inexpensive laminated impermeable packaging film and process for producing the same.

Another object of this invention is to provide a new and improved saran adhesive composition for the preparation of laminated impermeable packaging film.

A feature of this invention is the provision of an improved film laminate product comprising two or more films laminated with a moisture vapor and oxygen impermeable improved saran-containing adhesive composition.

Another feature of this invention is the provision of a new and improved saran-containing adhesive composition, for lamination of films, including a polymeric polyisocyanate and a polyglycol, polytriol or similar cross-linking agent.

Other objects and features of this invention will become apparent from time to time throughout the specification and claims as hereinafter related.

SUMMARY OF THE INVENTION

An oxygen and moisture vapor impermeable film laminate is prepared using a saran-containing adhesive. The adhesive is preferably applied to one ply of a two-ply laminate and the coated and uncoated plies wound together on a storage reel. The adhesive is cured merely by storage of the tightly wound reel and produces a tightly adhered laminate.

In preparing the laminate, one of the plies is normally polyethylene to provide for heat sealability of the product. The other ply is polyethylene, polypropylene, cellophane, polyester, nylon, etc., to give the required flex strength, abrasion resistance, gloss, vacuum formability, etc., to the laminate.

The adhesive used is a saran-containing adhesive including a polymeric polyisocyanate, and a cross-linking agent, such as a polyol such as a polyoxypropylene triol with a molecular weight of about 1,000. In general, polytriols, polyglycols, triols, and long chain polyols may be used as the cross-linking agent. For best results, the adhesive composition includes a surfactant such as a partial fatty acid ester of a polyol to cause better wet out of the adhesive on the surface of the film to be laminated and to act as a cross-linking agent.

DESCRIPTION OF THE PREFERRED EMBODIMENTS

Figure 1:
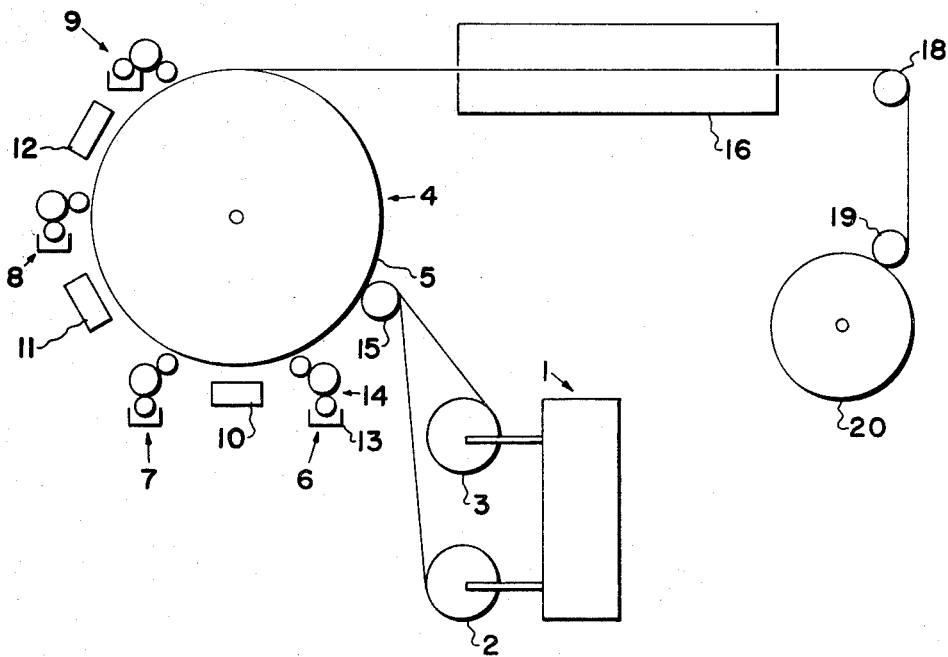
FIG. 1 is a schematic view of one preferred form of this invention in which a pair of film plies are fed through a press for application of an adhesive and lamination upon winding on a storage reel.

This invention is directed to the production of new film packaging materials in the form of multiply laminates adhered with a saran-containing adhesive. This invention broadly comprises a new and improved process for lamination of dimensionally stable plastic films such as nylon, Mylar (polyester), cellophane, polypropylene, polyethylene, vinyl, etc., to a plastic film such as polyethylene with a saran-containing adhesive which, upon curing, forms an oxygen and moisture vapor barrier layer, and the film packaging material or film laminate so produced. The laminating adhesive preferably includes a polymeric polyisocyanate resin as the adhesive portion, together with a saran resin in a proportion sufficient to provide oxygen and moisture vapor properties in the resulting laminate.

Adhesive compositions suitable for laminating films such as activated polyethylene to form impermeable film laminates must be formulated in accordance with several basic requirements.

1. The adhesive composition should have sufficient flow to follow and adhere to the film surfaces accurately and uniformly.

2. The adhesive composition should wet out as completely as possible to exclude any air or gas in the film.

3. The adhesive composition cure should start at the film surface and complete itself throughout its bulk so as to leave no slip planes.

4. The adhesive composition should be formulated to leave as thin a film as required to give complete and uniform coverage.

5. Free isocyanate groups and particularly those in isocyanate monomers must be reduced to a minimum level compatible with nontoxicity requirements in a food film laminate. This objective is effected by the a. use of a polymer, free of monomer, and
b. addition of hydroxyl-containing cross-linking curing agents including a plasticizing ingredient such as Actol 32-160 and a surfactant ingredient such as Span 85.

The preferred adhesive is a solution of the blended saran and polyisocyanate resins, containing a cross-linking curing agent including a plasticizer and a surfactant. The saran/polyisocyanate adhesive is generally formulated as follows. All parts are by weight.

A. Dissolve Saran F-220-25 percent in 2 parts acetone/1 part tetrahydrofuran.

B. Dilute Mondur CB (manufactured by Mobay Chemical Company), Mondur MR (manufactured by Mobay Chemical Company) or Marlon 383 (manufactured by Mobay Chemical Company) to 25 percent solids with acetone.

C. Blends of the above are useful in the range of 1 to 1,000 parts of A per part of B. A preferred composition is 100 parts of A to 3 parts of B.

The adhesive composition thus includes a polymeric polyisocyanate (preferably a polyurethane polyisocyanate), having an —NCO content of at least 10 percent wt. based on the solid isocyanate compound, and a saran resin. In accordance with this invention, a glycol or triol or similar cross-linking agent is incorporated in the adhesive composition in addition to the polymeric polyisocyanate (or other adhesive) and saran. If desired, the adhesive formulation may also include therein a trace of fatty amide, e.g., Kenamide E (Humko) or Armoslip CP (Armour) in the proportion of 0.2 percent based on saran. These additives function as plasticizers to promote flexibility. They may be used advantageously in the adhesive composition if the cross-linking agent is an ordinary short chain glycol or triol which otherwise tend to make the adhesive film brittle. They also function to promote wetting out of the adhesive of the film surface, e.g., as surfactants. Other surfactants such as Span 85 (or similar sorbitan fatty acid esters) may also be employed.

CROSS-LINKING AND PLASTICIZER INGREDIENTS

The cross-linking agent used in the adhesive composition may, in general, be any polyglycol or polytriol, triol, glycol or long chain polyol. Although ethylene, propylene, 1,3-butylene or 1,4-butylene glycols or triols may be employed as the cross-linking agent, a long chain glycol or triol or glycol ether is greatly preferred. A long chain cross-linking agent acts as an internal or self plasticizer, e.g., not only cross-links and provides surface bite but also provides flexibility in the resulting adhesive film. Thus, if a short chain cross-linking agent is employed as the cross-linking agent, a plasticizer such as a fatty amide becomes desirable as an additive in the adhesive formulation.

The preferred cross-linking agents are the polyethers formed from the addition of ethylene, propylene or butylene oxides, or other epoxies to the lower triols and glycols whereby a long chain is provided having terminal hydroxyls.

Polyethers with two or three terminal hydroxyl groups are ideal curing (or cross-linking) agents for film-forming or adhesive type polyisocyanate formulations. A compromise can be effected between long chain length (desirable for flexibility) and high proportion of available hydroxyl groups (desirable for reactivity with the isocyanate radical). The Actol triol series offers chains of polyoxypropylene attached to the nucleus of the original polyol (usually glycerol). The three terminal hydroxyl groups plus the long intervening oxypropylene chains react to give a three-dimensional flexible polyurethane film. In general, any polyoxypropylene triol with a molecular weight above about 200 may also be employed.

The high molecular weight polyoxypropylene triol Actol 32-160 provides primary hydroxyl groups for complete reaction with isocyanate functionality. Materials comparable to Actol 32-160 are other members of the Actol Triol series (e.g., Actol 31-56 or Actol 33-46), as well as many polyglycols such as Union Carbide Polypropylene Glycol 2025, a trademark of Union Carbide Corporation (Chemicals Division), New York, New York, for a polypropylene glycol with an average molecular weight about 2025.

SURFACTANT

In the adhesive composition, the surfactant Span 85 serves to ensure complete wetting of the plastic film surface by the adhesive composition at all times. Materials comparable to Span 85 are Span 65, Span 20, Span 40, Span 60 and Span 80. The members of Span series are sorbitan partial fatty acid esters. Span 65 is sorbitan tristearate; Span 20 is sorbitan monolaurate; Span 40 is sorbitan monopalmitate; Span 60 is sorbitan monostearate; Span 80 is sorbitan monooleate; and Span 85 is sorbitan trioleate. The Span series is a trademark of Atlas Chemical Industries, Inc. (Chemicals Division), Wilmington, Delaware. In general, surfactants are used which are reactive with and tend to cross link the isocyanate adhesive.

Other materials which can be used instead of the Spans are epoxylated vegetable oils such as Admex 710, a trademark of ADM Chemicals, Division of Ashland Oil and Refining Company, Minneapolis, Minn. for an epoxidized soybean oil, Paraplex G-62, a trademark of Rohm and Haas Company, Philadelphia, Pennsylvania, for an epoxidized soybean oil, Epoxol 9-5, a trademark of Swift and Company, Chicago, Ill., for an epoxidized oil (a polyepoxide monomer) with a minimum of 9 percent oxirane oxygen and an average of over 5 reactive groups per molecule, Epoxol 7-4, an epoxidized soybean oil with a minimum of 7 percent oxirane oxygen and an average of over 4 reactive groups per molecule, Unox Epoxide 206, a trademark of Union Carbide Chemicals Company, Division of Union Carbide Corporation, New York, New York, for vinylcyclohexane dioxide (1-epoxyethyl-3,4-epoxycyclohexane), Unox Epoxide 201, 3,4-epoxy-6-methylcyclohexylmethyl-3,4-epoxy-6-methylcyclohexanecarboxylate and similar epoxides.

The saran-containing adhesive, as described above, includes a saran resin to provide barrier properties to the cured film laminate and an adhesive component to provide adhesive properties. An example of a saran resin which is useful in the adhesive of this laminating process is a Dow Saran F-220 (80/20 vinylidene chloride-acrylonitrile copolymer). Although the impermeability of a saran resin depends somewhat on the particular comonomer in the resin, it depends primarily on the percentage of the comonomer and may be considered approximately independent of the particular comonomer. However, vinylidene chloride-acrylonitrile copolymers seem to give a somewhat higher impermeability than other saran copolymers and are generally preferred.

The process of lamination is preferably carried out using a printing press or a laminator for application of the laminating adhesive and the windup reel for the two film plies as the sole means of securing a tightly laminated film structure. However, other lamination processes (including hand lamination) may be employed in accordance with this invention. The adhesively laminated film is cured by storage in a tightly wound roll. If desired, the cure may be accelerated by storage at a slightly elevated temperature. The resulting film laminate is optically clear and has high moisture vapor and oxygen barrier properties. The barrier film formed by the hardened adhesive is continuous and homogeneous.

Figure 2:
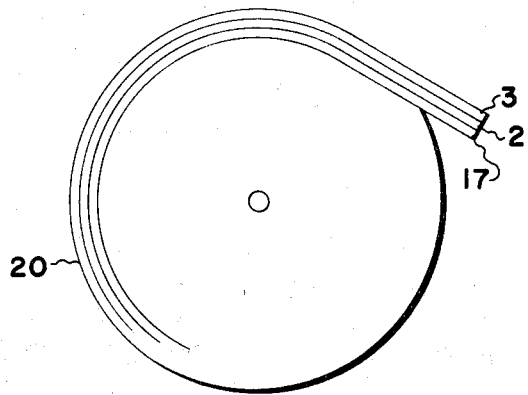
FIG. 2 is a detail end view of the laminated film on the storage reel of FIG. 1 showing the relationship of the laminated plies.

In FIGS. 1 and 2 of the drawings, the process of lamination which comprises a preferred embodiment of this invention is illustrated with respect to the printing of a pair of identical or different film plies on a printing press and subsequent lamination of the plies.

Referring to the drawings by numerals of reference, and more particularly to FIG. 1, there is shown a plastic film unwind stand 1 having a pair of rolls 2 and 3 of plastic film arranged for feeding film to a printing press for printing and for application of a saran-containing adhesive. Printing press 4 includes rotary drum 5 and has a plurality of printing stations 6, 7, 8, and 9 with intermediate dryers 10, 11, and 12 arranged to dry the imprint from each previous printing station. The printing stations are shown diagrammatically as including a container or well 13 for the printing ink or laminating saran adhesive and a train of printing rollers 14 arranged to transfer ink in the desired imprint to the film being passed around printing drum 5.

In the arrangement shown in FIG. 1, film 3 is polyethylene, which has the surface adjacent to printing drum 5 oxidized or irradiated or otherwise treated to render it receptive to printing inks or adhesives. The film 2 leaving the roll is of a dimensionally stable film material, such as nylon, Mylar (polyester), cellophane, polypropylene, polyethylene, etc., which contacts film 3 as it is fed past roller 15 at the input end of the printer. As the two plies of film are fed around printing drum 5, the outer film, viz, the nylon, Mylar, cellophane, polypropylene or polyethylene is printed at the successive printing stations 6, 7, and 8 and the imprints dried by dryer units 10, 11, 12. At the last printing station 9, a saran-containing adhesive coating is imprinted over the entire surface of the outer film ply. The saran-containing adhesive which is applied at this station is a pressure-sensitive adhesive which is rendered dry to the touch when the film are passed through dryer 16. The saran-containing adhesive which is used is one which is pressure sensitive but curable on extended storage at room temperature or may be cured by storage at a slightly elevated temperature for short periods of time.

After the film plies 2 and 3 have been printed and provided with a saran-containing adhesive coating 17 such as those described in the following examples, the film plies are passed through dryer 16 where the adhesive coating is dried and rendered largely tack free. The film plies then pass over roller 18 and press roller 19 and are wound on reel 20 under a slight pressure exerted by press roll 19. As the film plies are wound on reel 20, sufficient pressure is applied by press roll 19 and the tension of winding the films on the reel to ensure a very tight contact between saran adhesive layer 17 on film 2 and the outer (oxidized or treated) surface of film 3 with which the saran adhesive is contacted as the films are wound on reel 20.

Where the film is completely wound on reel 10, as shown in FIGS. 1 and 2, the outermost loop of film 3 is not adhered to any other film. This loop of film 3 would normally be unwound and cut off. Then when the ends of films 2 and 3 are subsequently unwound for use, those films are tightly laminated together with film 3 protecting the imprint or design laid down at the printing station 6, 7, and 8 on printing press 4. When this process is used for preparing a cover film laminate which carries no imprint, only printing station 9 on printing press 4 is used for laying down a uniform layer of the pressure-sensitive saran adhesive used in forming the desired film laminate. These laminated films are used in the formation of packages by vacuum forming techniques and other packaging techniques and are easily heat sealed. When these films are used for formation of packages, the polyethylene surfaces of the adjacent films are brought together in the formation of the package and the peripheral areas of contact are heat sealed using any conventional heat sealing apparatus.

Figure 3:
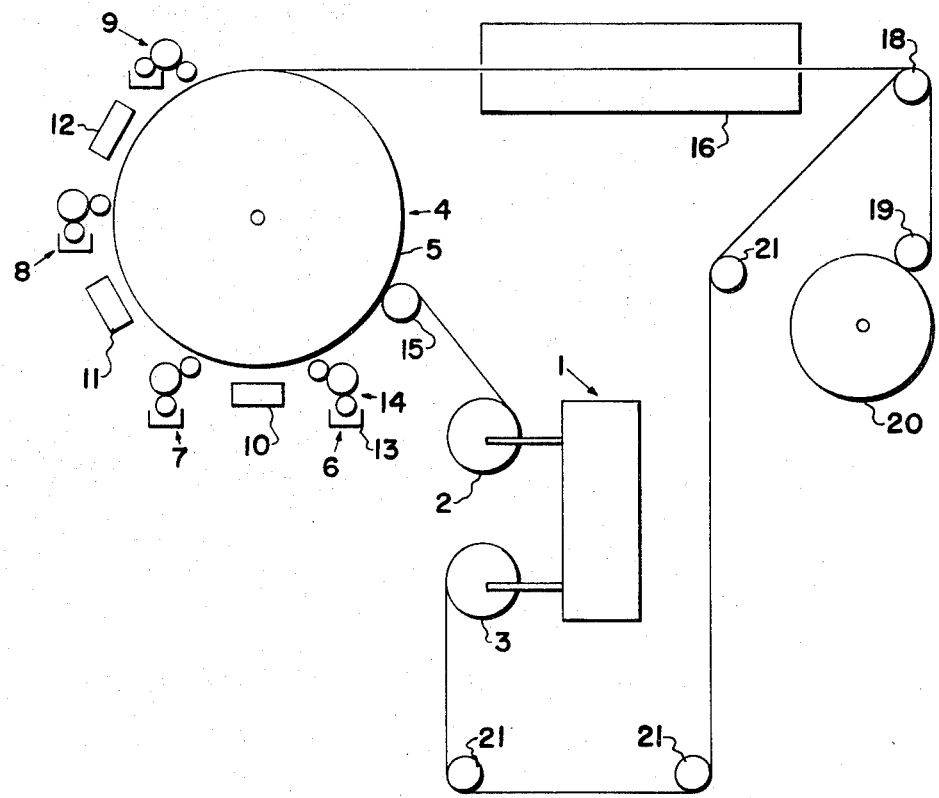
FIG. 3 is a schematic view of an alternate preferred embodiment of the invention in which one film ply has a laminating adhesive applied on a printing press and another film ply combined with the printed ply on the storage reel.
Figure 4:
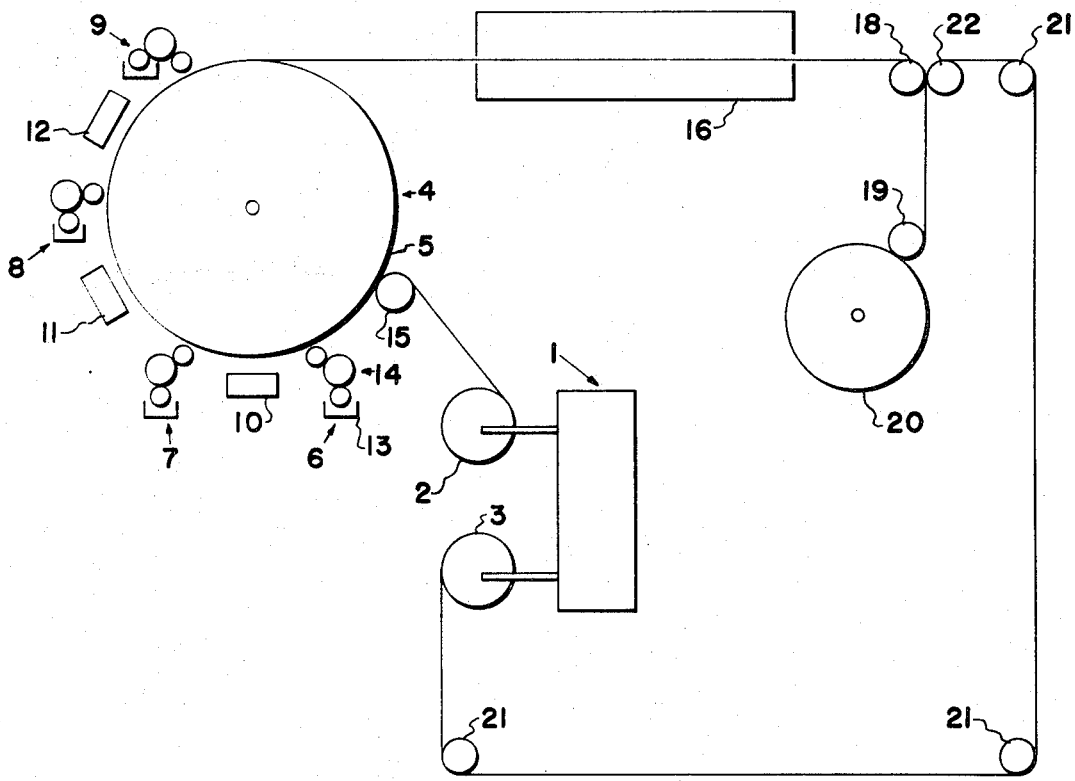
FIG. 4 is a schematic view of still another preferred embodiment of this invention in which one film ply has a laminating saran adhesive applied on a printing press and another film ply combined with the saran adhesive coated film prior to winding on the storage reel.

In carrying out the process described in FIGS. 1 and 2, it is necessary that the film plies passing through dryer 16 be moved at a sufficient speed or the dryer operated at sufficiently low temperature that the heat sealable film 3 (e.g., polyethylene) will not shrink. If the dryer temperature is too high or if the film has a residence time in the dryer sufficient that film 3 is heated above the shrinkage temperature, the film laminate will wrinkly badly as a result of shrinkage or distortion of the heat sealable film 3. In FIGS. 3 and 4 of the drawing, there is shown schematically an alternate preferred embodiment of the invention which avoids the problem of heat sensitivity of the heat sealable film in forming the film laminate.

In the apparatus and process shown in FIG. 3, the various steps of the process and the various components of the apparatus are essentially as shown and described in FIG. 1 except that the film plies are combined after the printed and saran-containing adhesive coated film leaves the dryer. In the schematic drawing shown in FIG. 3, the various components of the apparatus are given the same reference numerals as in FIG. 1. In the embodiment of the invention shown in FIG. 3, however, plastic film 2 is fed through the printing press alone and is printed and finally overcoated with saran-containing adhesive at printing station 9. The printed and adhesive overcoated film is then passed through the dryer 16 as in the embodiment shown in FIG. 1. The heat sealable film 3 is fed over rolls 21 and finally combined with film 2 at roller 18. After the films pass over rollers 18, the saran adhesive coating is still to the outside of film 2. The two films then pass around press roller 19 and are wound up on reel 20 as in the embodiment described in FIG. 1. As the films are wound up on reel 20, they are adhesively laminated with the result that the adhesive is eventually cured, either by extended storage at room temperature or a shorter storage at slightly elevated temperature, thereby producing an optically clear film laminate having printing located between the dimensionally stable film 2 and the heat sealable film 3.

Figure 5:
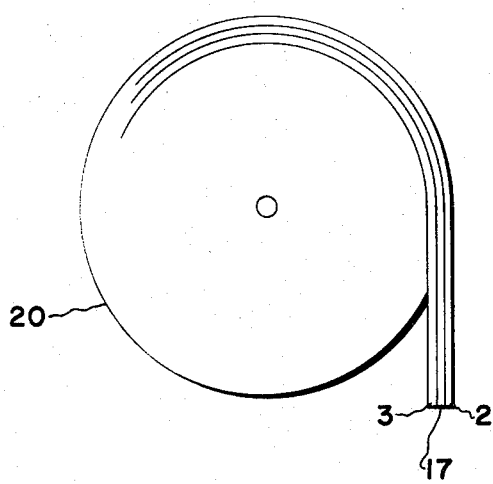
FIG. 5 is a detail end view of the storage reel of the process and apparatus shown in FIG. 4 and illustrates the relationship of the laminated plies.

In FIGS. 4 and 5 of the drawings, there is shown still another alternate embodiment of this invention. In this form of the invention, the dimensionally stable film 2 is fed through the printing press as in the form of the invention shown in FIG. 3. The film is printed, if desired, at the various stations and is finally overcoated with a pressure-sensitive saran-containing adhesive at printing station 9 as described for FIGS. 1 and 3. The film then passes through dryer 16 and over roll 18. The heat sealable film 3 is fed over rolls 21 and press roll 22 where the film 3 contacts saran adhesive coating on film 2 and the lamination is first effected. The adhesively laminated films then pass around press roll 19 and are wound on reel 20. The pressure of press roll 22 and 29 and the tension of the films when wound on reel 20 are effective to cause sufficient laminating pressure so that when saran-containing adhesive coating 17 is cured, a good laminated film is obtained. In FIG. 5, the laminated films are shown in more detail with the adhesive layer 17 positioned between films 2 and 3 as they are wound on reel 20.

The process of this invention can be carried out with a laminator as well as a printing press. However, for reasons of economy, a one-step printing/laminating operation is preferred. As indicated, polyethylene film can also be laminated to itself in operations such as that above to produce novel film laminates suitable for packaging purposes. The polyethylene which is used is preferably film which has been subjected during its production to a surface treatment of oxidation or irradiation on only one surface so that the film surface will be somewhat adherent to inks and adhesives, particularly polyisocyanate adhesives.

The nature and preparation of the film laminates of this invention are best illustrated by the following nonlimiting examples. In these examples parts, percentages or ratios are by weight unless otherwise stated.

EXAMPLE 1

This example shows the use of a saran-containing adhesive, including a polyol cross-linking agent, to form an oxygen and moisture vapor impermeable film laminate.

An adhesive was made up as follows:

| | | |
|---|---|---|
| Saran F-220 | 10 lb. | |
| first toluene | | 10 lb. |
| next methyl ethyl ketone (MEK) | 25 lb. | |
| then add | | |
| A) butyrolactone | 100 g. | |
| mixed with | | |
| Actol 32-160 | 45 g. | |
| B) Mondur CB/75 | 181 g. (=136 g. solid) | | dissolved in

MEK                    120 g.

Saran F-220 is an 80/20 vinylidene chloride-acrylonitrile copolymer. It is a broad molecular weight spectrum resin with a substantial proportion of low D.P. polymers. Actol 32-160 is a polyoxypropylene triol having a molecular weight of about 1,000. Mondur CB/75 is a polymeric polyisocyanate adhesive (16.5 percent —NCO content based on solids present). Marlon 383 polyisocyanate adhesive may be substituted for the Mondur adhesive, if desired. The adhesive is used in laminating treated (oxidized, UV treatment, corona discharge, etc.) polyethylene to Mylar, polypropylene, and polyethylene films in accordance with the above-described coating and laminating procedures. The adhesive is dried on film 2 in drier 16 and reaches a final cure in roll 20. The saran-containing adhesive, when applied to film 2 in the printing press, produces a transparent (optically clear), slightly tacky, pressure-sensitive coating over the entire film. The saran-containing adhesive layer is of sufficient impermeability that the resulting (cured) film laminate is oxygen and moisture vapor impermeable and does not delaminate when immersed in boiling water. The adhesive was also applied to a polyethylene film (surface-oxidized) and another oxidized polyethylene film laid over the adhesive-coated surface. The films were then placed in a hand press and cured at room temperature. An oxygen and moisture vapor impermeable laminate of high quality was obtained.

Example 2

This example shows the use of epoxy, polyester and fatty amide additives in an adhesive composition including a saran resin, polymeric polyisocyanate and cross-linking agent. This example also shows that lamination may be successfully effected without the application of heat.

Using 22 percent Saran F-220 batch admixed with 20/80 toluene-MEK the following master batch was made up on the solids ratio:

100 parts F-220

1.2 parts Actol 32-160 (in butyrolactone)

3.3 parts Mondur CB polyisocyanate (as solids) dissolved in MEK (120 g.) In four successive experiments, one part of the master batch, another part admixed with 2.1 Genepoxy 180 (a trademark of General Mills, Chemical Division, Kankakee, Ill., for a long chain epoxy resin), another part admixed with 14.0 Marlon 403 polyester, and another part admixed with 0.2 Kenamide E (Humko) fatty amide, were used as the adhesive composition, for laminating polyethylene films.

One mil Dow 217 polyethylene sheets were hand-laminated with each of the above adhesives, without heat cure, at a pressure of 500 p.s.i. to squeeze out excess adhesive lacquer. The film laminates were optically clear, flexible, easily curable, highly resistant (would not delaminate) to the action of boiling water and impermeable to oxygen and moisture vapor.

The oxygen transmission rate for the film laminated with the master batch having the epoxy additive was 12.8 cc./100 in.²/24 hr./a.t.m. The oxygen transmission rates for the other three films were each about 27 cc./100 in.²/24 hr./a.t.m.

The films produced by lamination with the adhesives including the polyester and fatty amide additives were somewhat more flexible than the film produced by lamination with the simple master batch adhesive and the film produced by lamination with adhesive including the epoxy resin therein. All of the films were satisfactorily laminated without the necessity for heat cure, thereby eliminating the danger of polyethylene shrinkage due to heat. In commercial production, of course, the lamination would preferably be carried out by the procedure described above and illustrated in the drawings.

Example 3

This example shows the use of a surfactant in the adhesive composition.

In later experiments an adhesive composition was made up as follows:

| | |
|---|---|
| Saran F-220 | 10 lb. |
| first toluene | 10 lb. |
| next methyl ethyl ketone | 25 lb. |
| add | |
| A) Actol 32-160 | 45 g. |
| dissolved in | |
| butyrolactone | 100 g. |
| B) Mondur CB/75 | 181 g. (=136 g. solid) |
| Span 85 | 3 g. |
| dissolved in | |
| methyl ethyl ketone | 120 g. |

The above adhesive composition is applied in a printing press according to the methods described above and illustrated in the drawings, to at least one of two films and used to laminate surface-oxidized polyethylene to nylon, Mylar (polyester), saran-coated cellophane, polypropylene, polyvinyl chloride and polyethylene sheets in successive experiments.

Improved results in the final laminated films (especially that of polyethylene to polyethylene) are obtained in that the films are not only very easily curable, but also highly flexible and more resistant to the transmission of oxygen (and other gases) therethrough.

EXAMPLE 4

This example shows that the adhesive composition alone, without the use of moistureproof coatings or oxygen impermeable films, is sufficient to provide oxygen and moisture vapor impermeability in the film laminate.

The adhesive composition of example 3 was used to hand-laminate plain, transparent, uncoated regenerated cellulose sheets to each other. The resulting film laminate was oxygen and moisture vapor impermeable and resistant to the action of boiling water.

One of the more important attributes of the improved multiply film laminate of this invention (in addition to the oxygen and moisture vapor impermeability) is that it will withstand the punishing effect of immersion in boiling water without separation of the plies. Thus, samples of film laminates, prepared as described above have been immersed in boiling water for as long as 3 hours without any separating or loosening of the film plies. Meat items, encased in such a laminate, can be cooked without separation of the film plies.

In the foregoing examples, the invention was described with reference to a two-ply laminate. It should be understood that the invention may be used in laminates of three or more plies using a saran-containing adhesive to yield the desired oxygen and water-vapor impermeability.

While this invention has been described with reference to certain specific embodiments as required by the patent laws, it is to be understood that within the scope of the appended claims, this invention may be practiced otherwise than as specifically disclosed.

We claim:

1. As an article of manufacture, a moisture vapor and oxygen-impereable film laminate comprising at least two plastic film plies each having at least one isocyanate adhesive-adherent surface, said film plies being laminated together at said adhesive-adherent surfaces by a transparent adhesive film substantially impermeable to oxygen and water vapor consisting of the cured product of a fluid, volatile organic solvent solution having a solute comprising a saran resin in an amount effective to render said adhesive film substantially impermeable to oxygen and water vapor, a polymeric polyisocyanate having an —NCO group content of at least about 10 percent, solids weight basis, and a curing agent for said polyisocyanate, said polyisocyanate and said curing agent being operable upon reacting to cross link within said adhesive film and provide a bond between said adhesive film and said film plies to render said adhesive film which is adherent in boiling water, said curing agent including at least one plasticizer ingredient which imparts improved flexibility to said adhesive film and at least one surfactant ingredient which promotes wetting out of said fluid solution on said film plies.

2. An article in accordance with claim 1 in which at least one of said plastic film plies is nylon, polyester, polypropylene, polyethylene, regenerated cellulose, or cellophane and laminated thereto is a plastic film ply of polyethylene.

* * * * *